United States Patent
Dake et al.

(10) Patent No.: US 7,139,693 B1
(45) Date of Patent: Nov. 21, 2006

(54) USING SOFTWARE OBJECTS TO COMMUNICATE WITH HARDWARE DEVICES

(75) Inventors: Steven C. Dake, Tempe, AZ (US); Paul E. Luse, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 09/469,277

(22) Filed: Dec. 22, 1999

(51) Int. Cl.
G06F 9/455 (2006.01)
G06F 9/44 (2006.01)

(52) U.S. Cl. .......................... 703/24; 703/25; 703/21; 717/135

(58) Field of Classification Search ................ 703/24, 703/25, 21; 717/135; 709/318, 320, 321
See application file for complete search history.

(56) References Cited

U.S. PATENT DOCUMENTS

| | | | | |
|---|---|---|---|---|
| 5,546,595 A | * | 8/1996 | Norman et al. | 710/10 |
| 5,555,415 A | * | 9/1996 | Allen | 709/318 |
| 5,710,727 A | * | 1/1998 | Mitchell et al. | 702/128 |
| 5,717,614 A | * | 2/1998 | Shah et al. | 702/119 |
| 5,732,261 A | * | 3/1998 | Savitzky et al. | 707/103 R |
| 5,828,882 A | * | 10/1998 | Hinckley | 709/318 |
| 5,847,955 A | * | 12/1998 | Mitchell et al. | 700/86 |
| 5,877,966 A | * | 3/1999 | Morris et al. | 716/4 |
| 5,881,270 A | * | 3/1999 | Worthington et al. | 703/21 |
| 5,910,180 A | * | 6/1999 | Flory et al. | 709/321 |
| 5,915,253 A | * | 6/1999 | Christiansen | 707/103 |
| 5,926,775 A | * | 7/1999 | Brumley et al. | 702/127 |
| 5,930,482 A | * | 7/1999 | Carter et al. | 710/100 |
| 6,247,077 B1 | * | 6/2001 | Muller et al. | 710/74 |

OTHER PUBLICATIONS

Donald G. Firesmith & Edward M. Eykholt; Dictionary of Object Technology : the definitive desk reference; 1995; SIGS Books, Inc. New York, N.Y.; SIBN 1-884842-09-7; Page(s) 344-347.*

"The Object-Oriented Though Process"; Weisfeld Matt; Apr. 2000; SAMS Publishing, Indianapolis, Indiana; ISBN 0-672-31853-9; Appendix A.*

* cited by examiner

Primary Examiner—Paul L. Rodriguez
Assistant Examiner—Dwin M. Craig
(74) Attorney, Agent, or Firm—Trop, Pruner & Hu, P.C.

(57) ABSTRACT

An interface to one or more hardware devices includes a configuration library and objects to model the hardware. Software programs using the interface need not understand how to communicate with the hardware. Instead, the software programs may communicate with the interface. In turn, the interface communicates with the hardware. The software may be written when the hardware implementation features are unknown.

7 Claims, 10 Drawing Sheets

USING SOFTWARE OBJECTS TO COMMUNICATE WITH HARDWARE DEVICES

BACKGROUND

This invention relates to software programs and, more particularly, to application programming interfaces.

Software development is a robust industry. Following the development of new hardware, software typically provides an interface to the hardware.

Before writing a software program, a developer may need to understand the functional requirements of the software, the hardware upon which the software may operate, and the operating environment. Particularly for complex software, a logical organization of the software may also be beneficial to reducing defects.

Some software programs are structured so that they work in a variety of operating environments. Additionally, software that is well-written anticipates new hardware to be supported by the software program. An application programming interface, or API, is a tool for structuring such software applications. As the name suggests, the API "interfaces" the core application code with the rest of an operating environment.

APIs generally include specifications or protocols for their use. Programs written according to the protocol may have a similar interface to the end-user, for example. APIs also may include routines, libraries, or other tools which minimize duplicity of effort for various developers who may perform similar functions. Thus, APIs are tools that typically permit new development to support new operating systems, to support new hardware, or to add new software features to existing application programs.

Software which supports a number of hardware components may benefit from such interfaces. Further, software which supports hardware from more than a single vendor, each with a distinct hardware requirement, may interface to an API to simplify code development. For projects where the hardware is available only after the software is written, an API may also promote developing the software within the project time constraints.

Thus, there is a continuing need for an interface between a plurality of hardware devices and a software program to support the hardware devices such that the software program is simplified while continuing to support the hardware.

SUMMARY

In general, in one embodiment of the invention, a method comprises defining a plurality of hardware devices as a plurality of objects, providing a plurality of tools to perform a plurality of operations on the plurality of objects, executing a software program to use the tools and responding to the plurality of operations by the plurality of hardware devices.

Other features and embodiments will become apparent from the following description, the drawings, and from the claims.

DETAILED DESCRIPTION

In the prior art, a software program may be written to support one or more hardware devices. For example, the software program may include a graphical user interface which permits a user of the software program to control or monitor the hardware devices. The software program may initialize the hardware devices, as another example.

In supporting the hardware device, the software program may directly interact with the hardware device, or instead interact with an interface to the hardware. The interface to the hardware device may itself be a second software program.

The software program may be written to support hardware devices from a particular vendor. In order to support hardware devices from a second vendor, the software program may be changed, the second vendor's hardware device or an interface to the second vendor's hardware device may be changed. For each distinct hardware type supported by the software program, the software program may grow proportionately.

Figure 1:
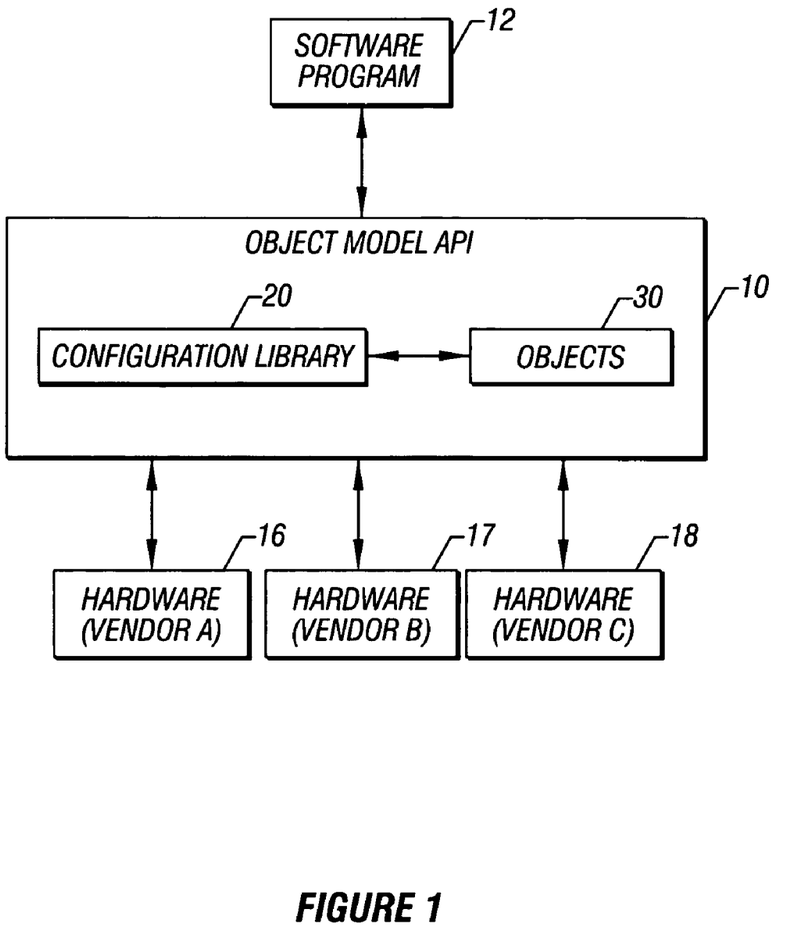
FIG. 1 is a block diagram of an object model API according to one embodiment of the invention.

An object model application programming interface (API) 10 may provide an alternative to the prior art. Turning to FIG. 1, the object model API 10, according to one embodiment of the invention, may include a configuration library 20 and a plurality of objects 30. The object model API 10 is coupled between a software program 12 and a hardware device 16, a hardware device 17, and a hardware device 18.

The hardware device 16 may, for example, be supplied by a different vendor than the hardware device 17, etc. The hardware device 16 may itself include software, such as a software interface (not shown). The hardware device 16 may operate using one protocol, the hardware device 17 may operate using a second protocol, and so on.

The object model API 10 may reside between the software program 12 and the hardware devices 16–18. In one embodiment of the invention, the object model API 10 provides the capability to abstract the hardware devices 16–18 so that the software program 12 need not be written with the distinct requirements of the hardware devices 16–18 in mind. Instead, the software program 12 communicates with the objects 30 which model the hardware devices 16–18. In turn, the hardware devices 16–18 communicate with the object model API 10, whether to take actions, provide information, or perform other operations on the hardware devices 16–18.

The object model API may be beneficial for some hardware/software models. The software program 12 may be written with less than full knowledge of the particular hardware involved. Instead, using the object model API 10, the software program 12 may be written once a "model" of the hardware devices 16–18 has been defined. The objects 30 represent this model.

Each hardware device 16–18 to be supported by the software program 12 communicates with the object model API 10. Where the hardware devices 16–18 include a software interface, the interface may communicate with the object model API 10. For example, the interface to the hardware devices 16–18 may respond to commands from the object model API 10 such that the commands are executed upon the hardware devices 16–18.

As part of the object model API 10, the configuration library 20 includes a set of tools which enable the software program 12 to communicate with the objects 30. The objects 30 model the hardware devices 16–18. Once the software program 12 knows how to retrieve and manipulate the objects 30, using the tools from the configuration library 20, the software program 12 may perform operations on the objects 30.

The objects 30, in essence, define the hardware devices 16–18 by modeling the operations (or methods), the attributes (or properties), and the actions (or events) of each hardware device 16–18. An operation, known as a method, may be invoked upon an object. The method is appropriate for the real-world hardware modeled by the object. One or more attributes, described below as properties, may also be used to define an object. Actions, described below as events, may model real-world occurrences by the hardware devices 16–18.

In one embodiment of the invention, each object encapsulates the operations of, the attributes of, and the actions to be taken upon the real-world hardware modeled by the object. For example, the hardware device 16 may be divided into components, each of which is modeled as a separate object 30. The characteristics for each component are identified, and become properties and methods of the object 30. Likewise, hardware devices 17 and 18 may have objects 30 for modeling their components.

Figure 2:
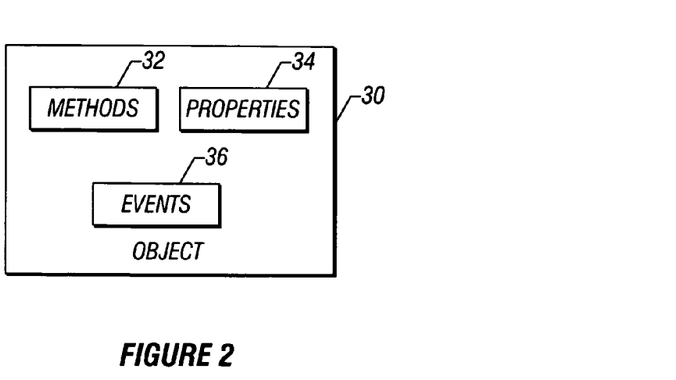
FIG. 2 is a block diagram of an object of the object model API according to one embodiment of the invention.

In FIG. 2, in one embodiment of the invention, the object 30 includes methods 32, properties 34 and events 36 for representing the characteristics of the hardware devices 16–18 modeled by the object 30. The methods 32 may include functions or actions which the hardware devices 16–18 modeled by the object 30 may perform.

For example, suppose the hardware device modeled is a staple gun. A staple gun may push staples into a piece of paper. Accordingly, an object modeling the staple gun may appropriately include a method, PushStaples.

The properties 34 may include attributes of the hardware device 16. For example, attributes of the staple gun may include the number and type of staples. An object modeling the staple gun may appropriately include two properties, NumberOfStaples and StapleType.

Further, the properties 34 may be defined as having different types. In the staple gun example, NumberOfStaples may be represented as an integer type, while StapleType may be a Boolean variable.

The events 36 may include those behaviors of the hardware devices 16–18 for which notification may be requested. For example, the staple gun may run out of staples. Accordingly, an object modeling the staple gun may appropriately include an event, OutOfStaples.

The methods 32, the properties 34, and the events 36 of the object 30 thus model the behavior of the hardware devices 16–18. Once the hardware devices 16–18 are defined in terms of these features, the software program 12 may communicate with the object 30 instead of the hardware devices 16–18. In turn, the hardware devices 16–18 communicate with the object model API 10.

Figure 3:
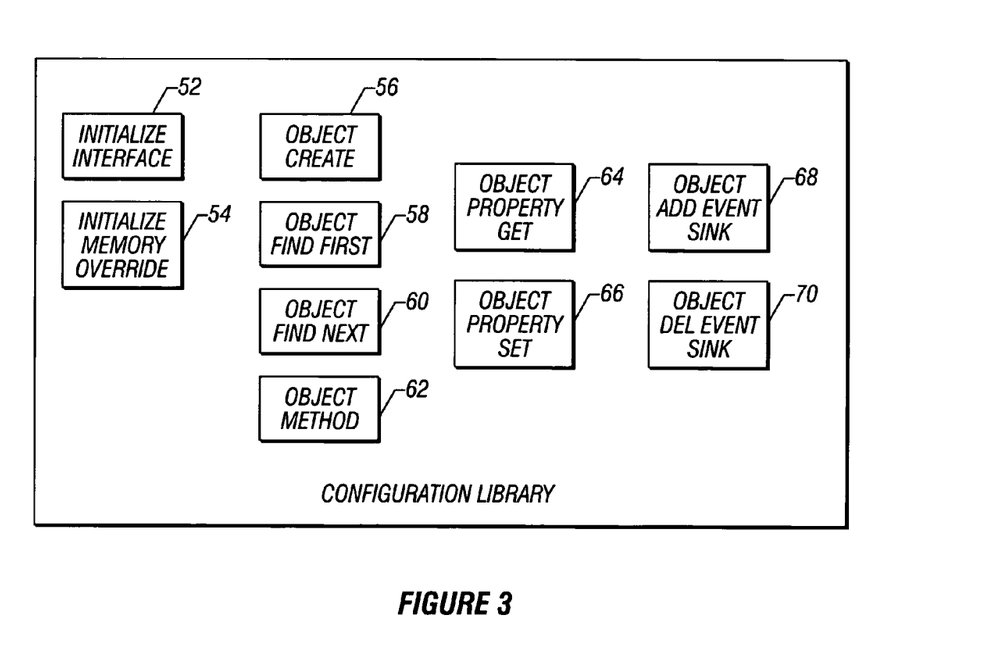
FIG. 3 is a block diagram of the configuration library of the object model API according to one embodiment of the invention.

In one embodiment of the invention, the configuration library 20 may be used to communicate with the objects 30. In FIG. 3, the tools of the configuration library 20 may include several functions. The functions may be used by the software program 12 to communicate with the objects 30.

The configuration library 20 includes an initialization function 52. The initialization function 52 initializes the configuration library 20. In one embodiment of the invention, the initialization function 52 is executed prior to any other function in the configuration library 20.

A second initialization function 54 allows the software program 12 to override any memory management functions of the environment. Some system management architectures provide unique memory management routines. Under such system management architectures, memory management routines may be replaced with other routines. The second initialization function 54 thus overrides the memory manager upon command.

The configuration library 20 further includes a set of functions for object creation and object discovery. An object locating function 58 provides the capability to locate an object of a specific type with a specific property value using a comparison operator as an input value. The object locating function 58 may be used to determine the components of the hardware device 16 by the software program 12, for example. Closely associated with the object locating function 58, a subsequent object locating function 60 provides the capability to locate the next object based upon the parameters provided in the object locating function 58.

In one embodiment of the invention, an object creation function 56 allows the software program 12 to create an object for the hardware devices 16–18 which may not be physically located, e.g., virtual hardware features. The object creation function 56 essentially creates an internal storage area for the object 30. The internal storage area may be used for the properties 34 of the object 30 used to represent the virtual hardware feature, for example.

Another tool in the configuration library 20, a method invocation function 62, allows the software program 12 to execute or invoke a method 32 within an object 30. The method 32 may include parameters which may be set prior to invoking the method 32 or may be returned upon executing the method 32. In one embodiment of the invention, the parameters may include properties 34 of the object 30 for which the method 32 is invoked.

In one embodiment of the invention, the configuration library 20 also provides functions for manipulating the properties 34 of the object 30. A get property function 64 enables the software program 12 to retrieve the property 34 of the object 30. Likewise, a set property function 66 allows the software program 12 to set the property 34 of the object 30.

The configuration library 20 also provides functions which enable the software program 12 to be notified when an event to one of the hardware devices 16–18 occurs. A monitor event function 68, when enabled, allows the software program 12 to be notified upon the occurrence of the particular event 36 of the object 30. Likewise, a monitor event off function 70 allows the software program 12 to turn off monitoring of the particular event 36 of the object 30.

Thus, in one embodiment of the invention, the configuration library 20 of the object model API 10 provides the capability to invoke the methods 32, set and retrieve the properties 34, and monitor the events 36 for a given object 30. The software program 12 may utilize the functions in the configuration library 20 to communicate with the objects 30 which model the hardware devices 16–18.

The object model API 10 may be used as a front end to a variety of types of hardware devices 16–18. By distilling the hardware devices 16–18 into distinct components, an object model 30 for each component may then be created. Like the staple gun, described above, a variety of hardware devices may then be defined in terms of operations (methods), attributes (properties) and actions (events). These methods 32, properties 34, and events 36 are then encapsulated as objects 30. To support the hardware devices 16–18, a developer may then use the functions of the configuration library 20, described above, to perform operations upon the objects 30.

Because the software program 12 does not communicate directly with the hardware devices 16–18, the requirements of the hardware devices 16–18 are unimportant to the software program 12. Instead, the software program 12 communicates with the objects 30 using the tools of the configuration library 20. In this way, the software program 12 may support the hardware devices 16–18, even when the hardware devices 16–18 change. Further, the software program 12 may support future hardware additions.

Software which supports a redundant array of independent disks, or RAID, system, may benefit from the object model API 10. A RAID system is essentially a collection of disks, connected by one or more buses, and employing one or more controllers. RAID systems may employ one or more disk drives, typically to provide fault tolerance and to enhance performance. In addition to the disk drives themselves, the RAID system may include a plurality of controllers and buses. Further, the RAID system may be organized into physical representations of disks, called arrays, or logical representations of disks, called volumes. The RAID hardware, as well as its supporting software, may therefore be complex.

Figure 4:
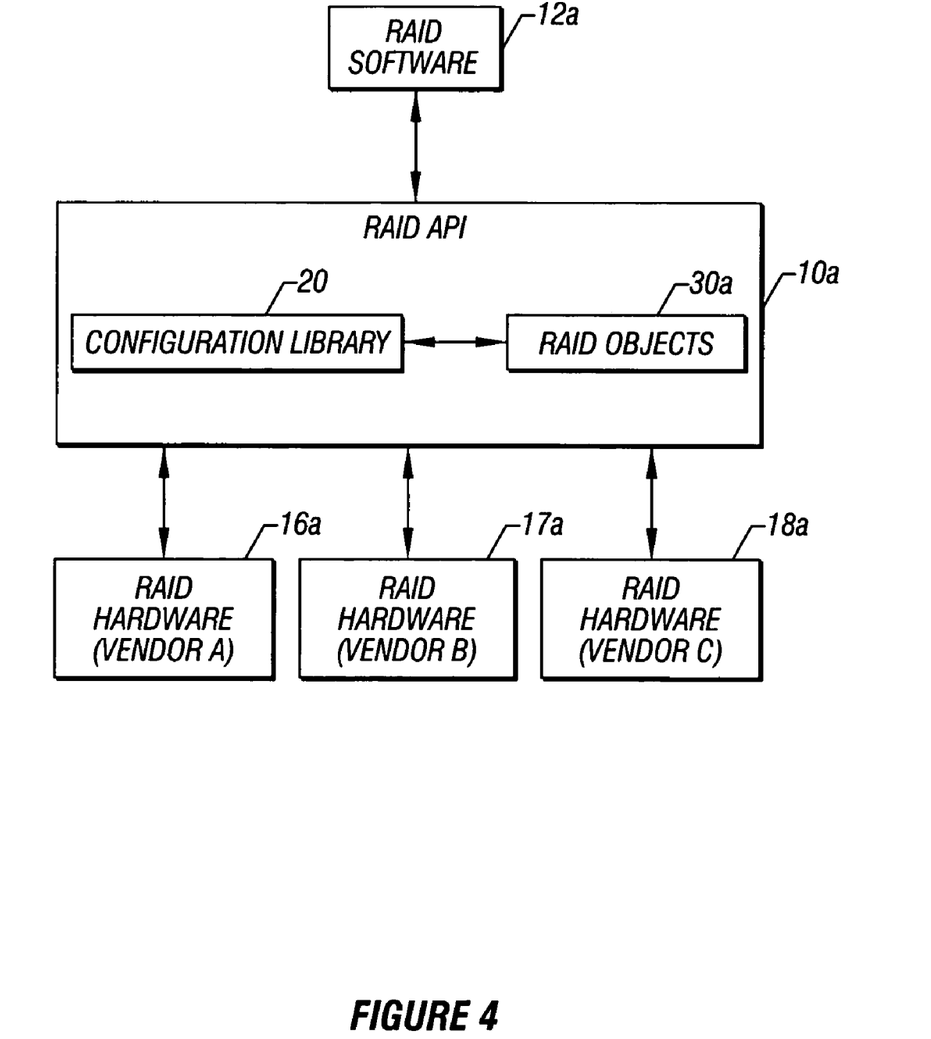
FIG. 4 is a block diagram of the RAID API according to one embodiment of the invention.

Turning to FIG. 4, a particular implementation of the object model API 10, shown as a RAID object API 10*a*, includes the configuration library 20 and RAID objects 30*a*, in accordance with one embodiment of the invention. The RAID API 10*a* interfaces with a RAID software program 12*a* and a RAID hardware device 16*a*, a RAID hardware device 17*a*, and a RAID hardware device 18*a*.

As in FIG. 1, the RAID hardware devices 16*a*–18*a* may include RAID hardware device 16*a*, from one vendor, RAID hardware 17*a*, possibly from a second vendor, and RAID hardware 18*a*, possibly from a third vendor. Each RAID hardware device 16*a*–18*a* may include a software interface (not shown). The RAID hardware devices 16*a*–18*a* are responsive to directives from the RAID API 10*a*. Likewise, the RAID software 12*a* communicates with the objects 30*a* modeling the RAID hardware devices 16*a*–18*a* using the configuration library 20.

As with the object model API 10, with the RAID API 10*a*, RAID objects 30*a* may be defined according to the RAID hardware devices 16*a*–18*a*. The RAID hardware devices 16*a*–18*a* may also be described in terms of physical groupings of disks into a unified storage medium, known as an array. Alternatively or additionally, the RAID hardware devices 16*a*–18*a* may be described in terms of logical groupings, or volumes.

Figure 5:
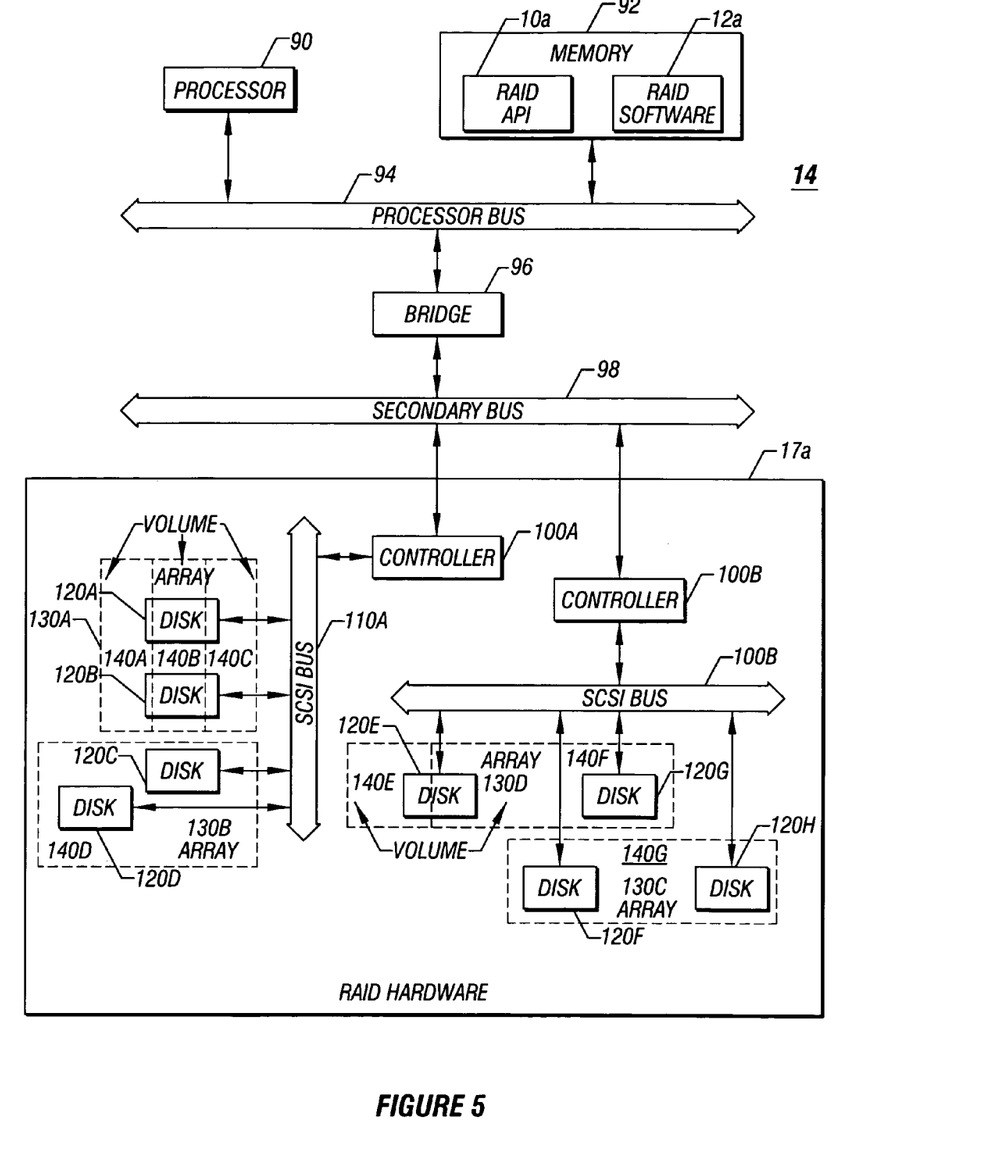
FIG. 5 is a block diagram of RAID hardware in accordance with one embodiment of the invention.

The RAID hardware 16*a*–18*a* may be distilled into distinct components, which are then modeled as objects 30*a*. In FIG. 5, a system 14 according to one embodiment of the invention may include a processor 90 and a memory 92 are coupled to a processor bus 94. A secondary bus 98 may be coupled to the processor bus 94 via a bridge 96.

The RAID hardware devices 17*a* extend from the secondary bus 98, in one embodiment of the invention. Controllers 100A and 100B are coupled to the secondary bus 98. From the controllers 100, a small computer system interface, or SCSI, bus 110A and a SCSI bus 110B connect the controllers 100A and 100B to a plurality of disks 120. For example, disks 120A, 120B, 120C and 120D are coupled to the SCSI bus 110A.

As stated above, the RAID system may be organized into physical representations of disks, called arrays, or logical representations of disks, called volumes. In one embodiment of the invention, the volumes may be repositories for information about the volume, while the arrays store no information. So, for example, information about a volume may be written on the volume itself. The array has no such storage capability.

In FIG. 5, the RAID hardware devices 17*a* include a plurality of arrays 130. For example, disks 120C and disks 120D are joined to form array 130B. In one embodiment of the invention, each array 130 has at least one volume 140 associated with the array 130. In FIG. 5, the array 130D includes two volumes 140E and 140F. However, array 130B includes only a single volume 140D.

The RAID hardware devices 17*a* may be presented in a number of different ways. For example, in FIG. 5, the controllers 100A and 100B extend from the same secondary bus 98. Alternatively, these controllers 100 may extend from distinct buses.

Figure 6:
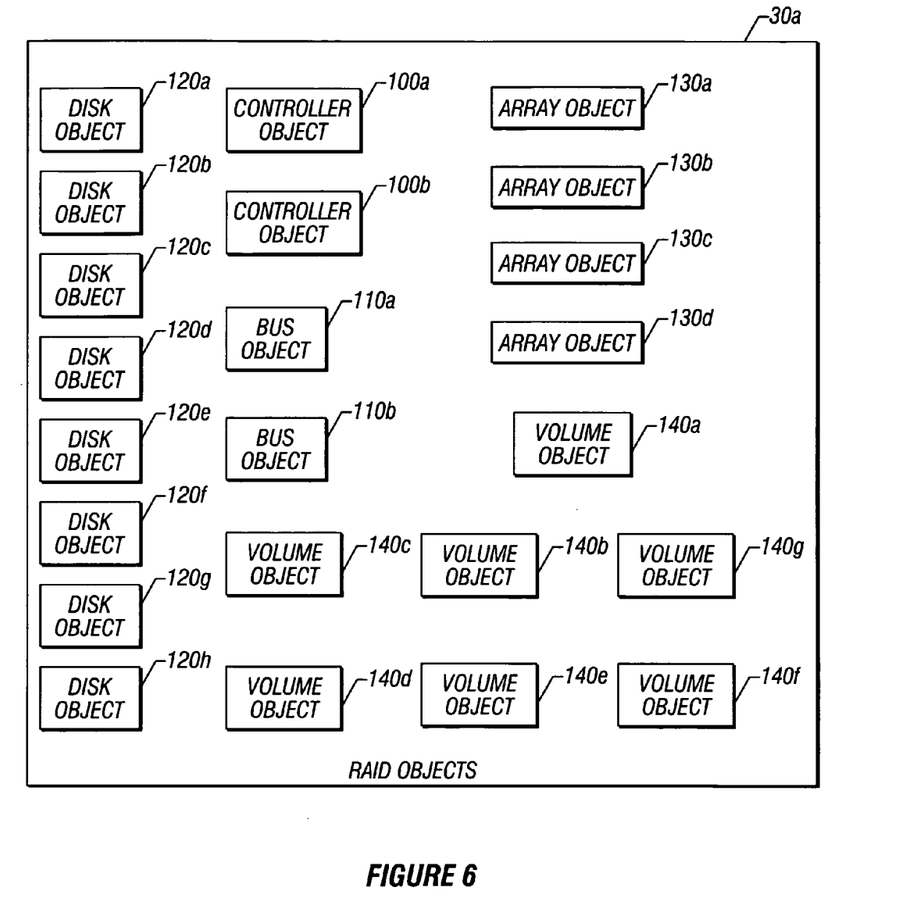
FIG. 6 is a block diagram of a plurality of RAID objects for the RAID hardware of FIG. 5 in accordance with one embodiment of the invention.

From the physical RAID hardware devices 17*a* of FIG. 5, a plurality of RAID objects 30*a* may be derived. In FIG. 6, the RAID objects 30*a* include controller objects 100, bus objects 110, disk objects 120, array objects 130, and volume objects 140.

Each of the RAID objects 30*a* of FIG. 6 represents a component of the RAID hardware devices 17*a* in FIG. 5. For example, the RAID hardware devices 17*a* include eight disks 120A–120H. Thus, the RAID objects 30*a* include eight disk objects 120*a*–120*h*. Likewise, the RAID hardware devices 17*a* include two controllers 100A and 100B. Accordingly, in FIG. 6, controller object 100*a* and 100*b* are two of the RAID objects 30*a*. The RAID objects 30*a* thus represent, using objects, the entire configuration of the RAID hardware devices 17*a*.

Figure 7:
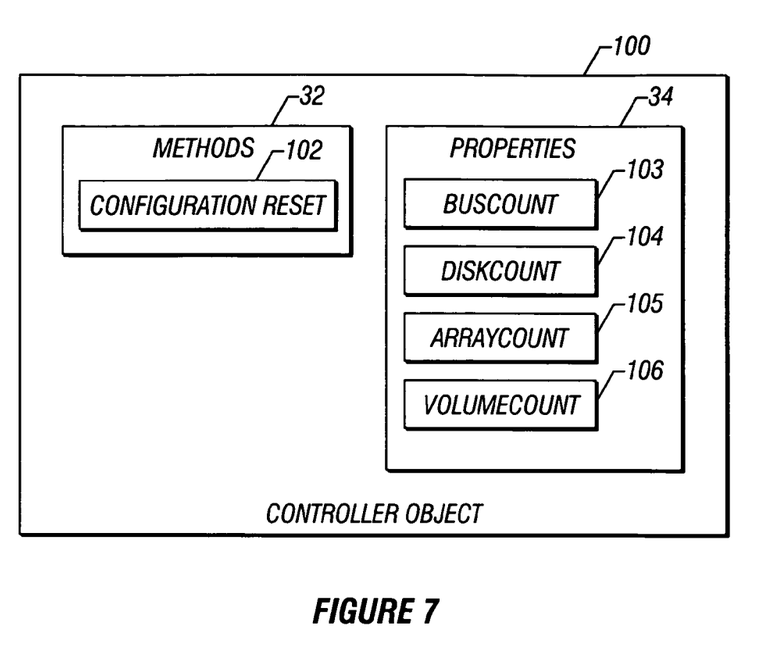
FIG. 7 is a block diagram of the controller object in accordance with one embodiment of the invention.

In one embodiment of the invention, each of the RAID objects 30*a* includes methods 32, properties 34 and events 36, which are consistent with the particular hardware features these objects 30*a* model. In FIG. 7, for example, the controller object 100 includes a method 102, used to reset the controller of the RAID hardware devices 17*a*. Likewise, the controller object 100 includes properties 34, such as a bus counting method 103, used to report the number of buses on the controller, and a disk counting method 104, for reporting the number of disks on the controller, an array counting method 105 and a volume counting method 106 to report on the number of arrays and volumes on the controller, respectively. Each of the properties 34 is accessible to the RAID software 12*a* for communicating with the controller of the RAID hardware devices 17*a*.

Figure 8:
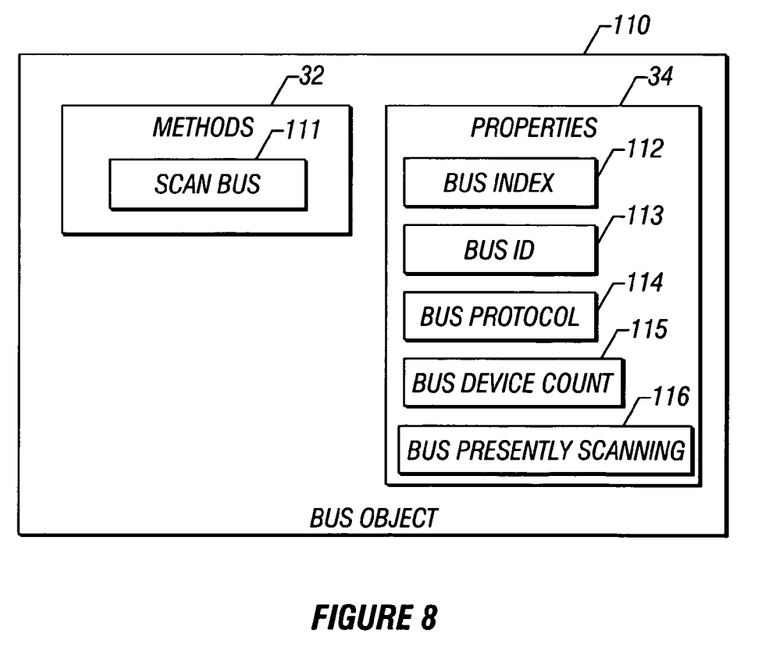
FIG. 8 is a block diagram of the bus object in accordance with one embodiment of the invention.

In FIG. 8, the bus object 110 includes a scan bus method 111 and several properties 34, including a bus indexing property 112, a bus identification property 113, a bus protocol property 114, a bus device count property 115 and a Boolean property 116, which tells whether the bus is presently scanning. As with the controller object 100, the bus object 110 includes no events for the RAID software 12a to monitor. However, the RAID software 12a may set or retrieve any of the properties or may invoke the scan bus method 111, as desired.

Figure 9:
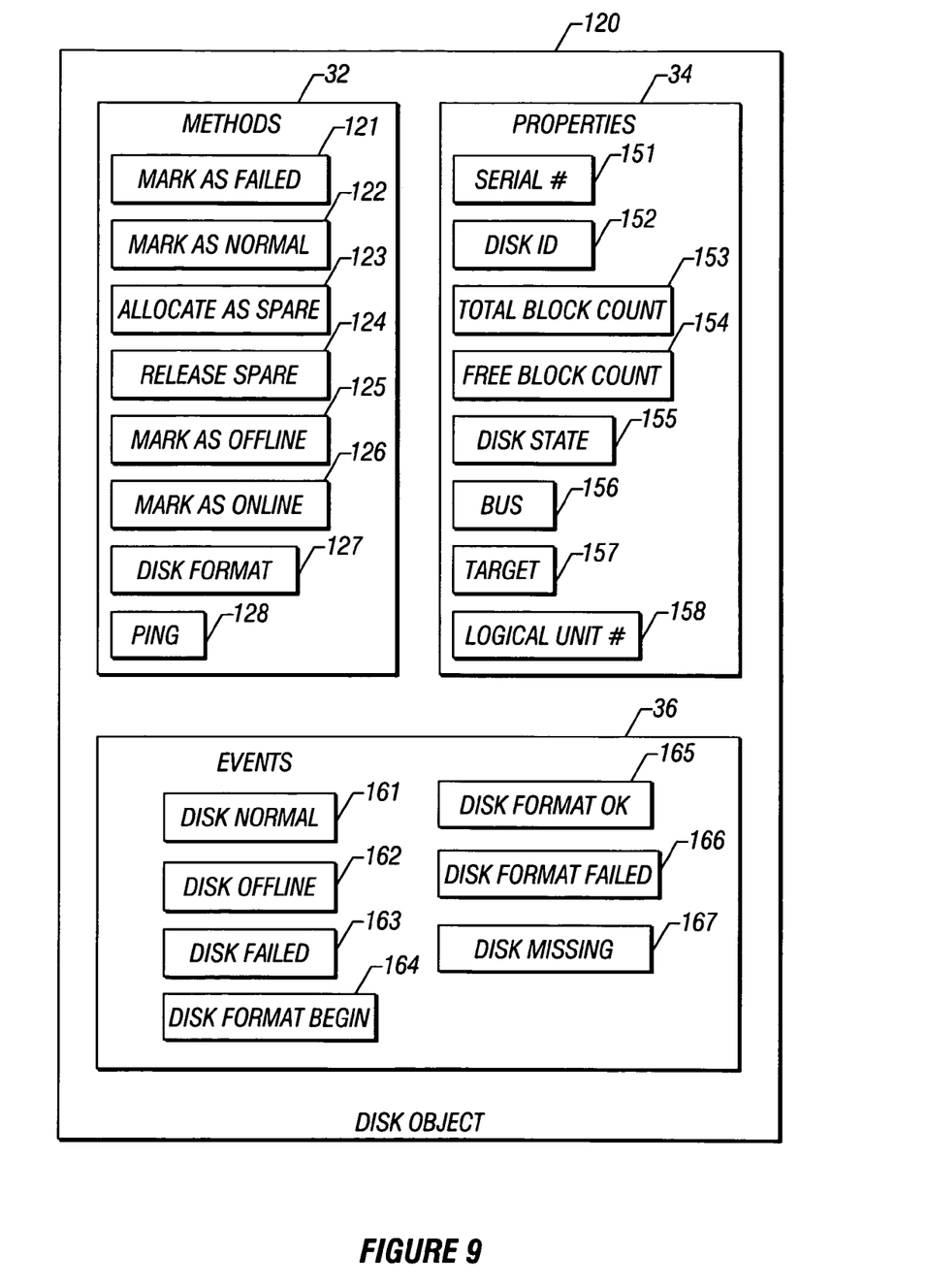
FIG. 9 is a block diagram of the disk object in accordance with one embodiment of the invention.

In FIG. 9, the disk object 120 includes methods 32, properties 34, and events 36 which allow the RAID software 12a to communicate with the plurality of disks, such as the eight disks 120A–120H of FIG. 5. For example, a method 122, a method 125, and a method 126 may be used to mark a disk as normal, offline, and online, respectively. A total block count property 153 may be used to retrieve the total block count of the disk.

In addition to several methods 32 and properties 34, the disk object 120 includes events 36 which may permit the RAID software 12a to monitor the behavior of each disk modeled by the disk object 120. For example, a disk is normal event 161 may permit the RAID software 12a to be notified when the disk has been marked as normal (following the invocation of the mark as normal method 122). Recall that the configuration library 20 provides two functions, event monitor on 68 and event monitor off 70, which allow the RAID software 12a to monitor one or more events 36 of the disk object 120.

Figure 10:
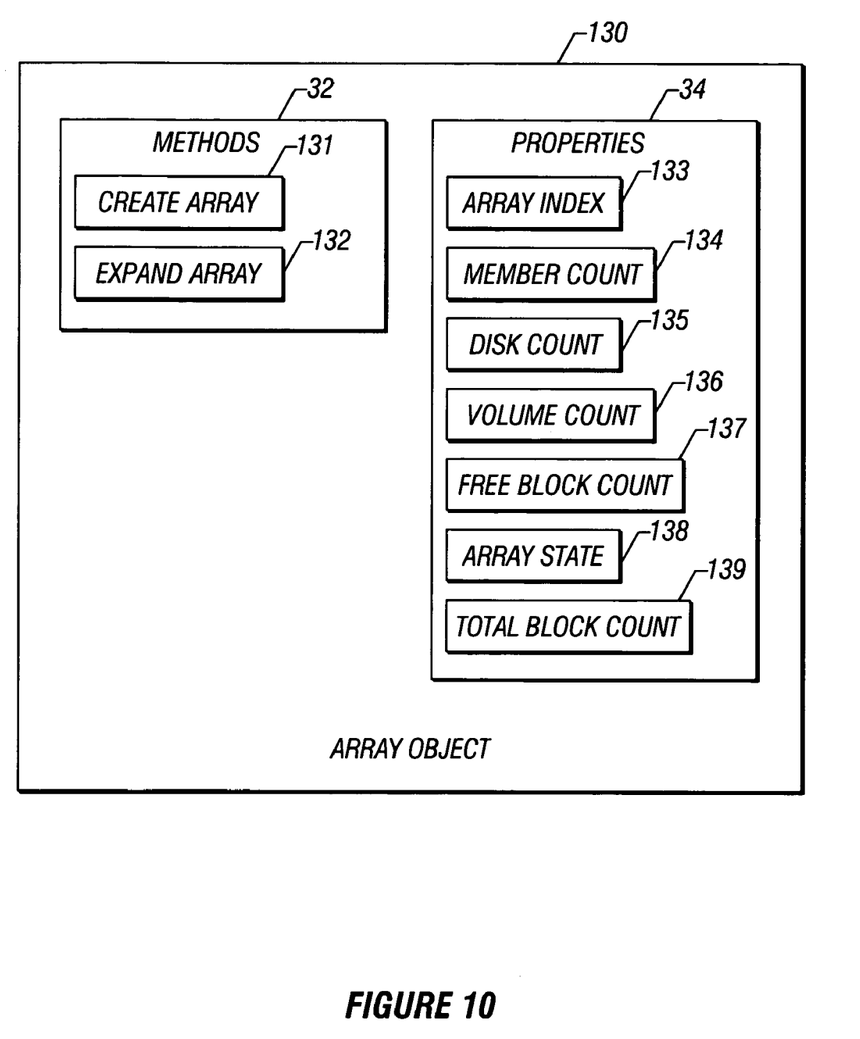
FIG. 10 is a block diagram of the array object in accordance with one embodiment of the invention.
Figure 11:
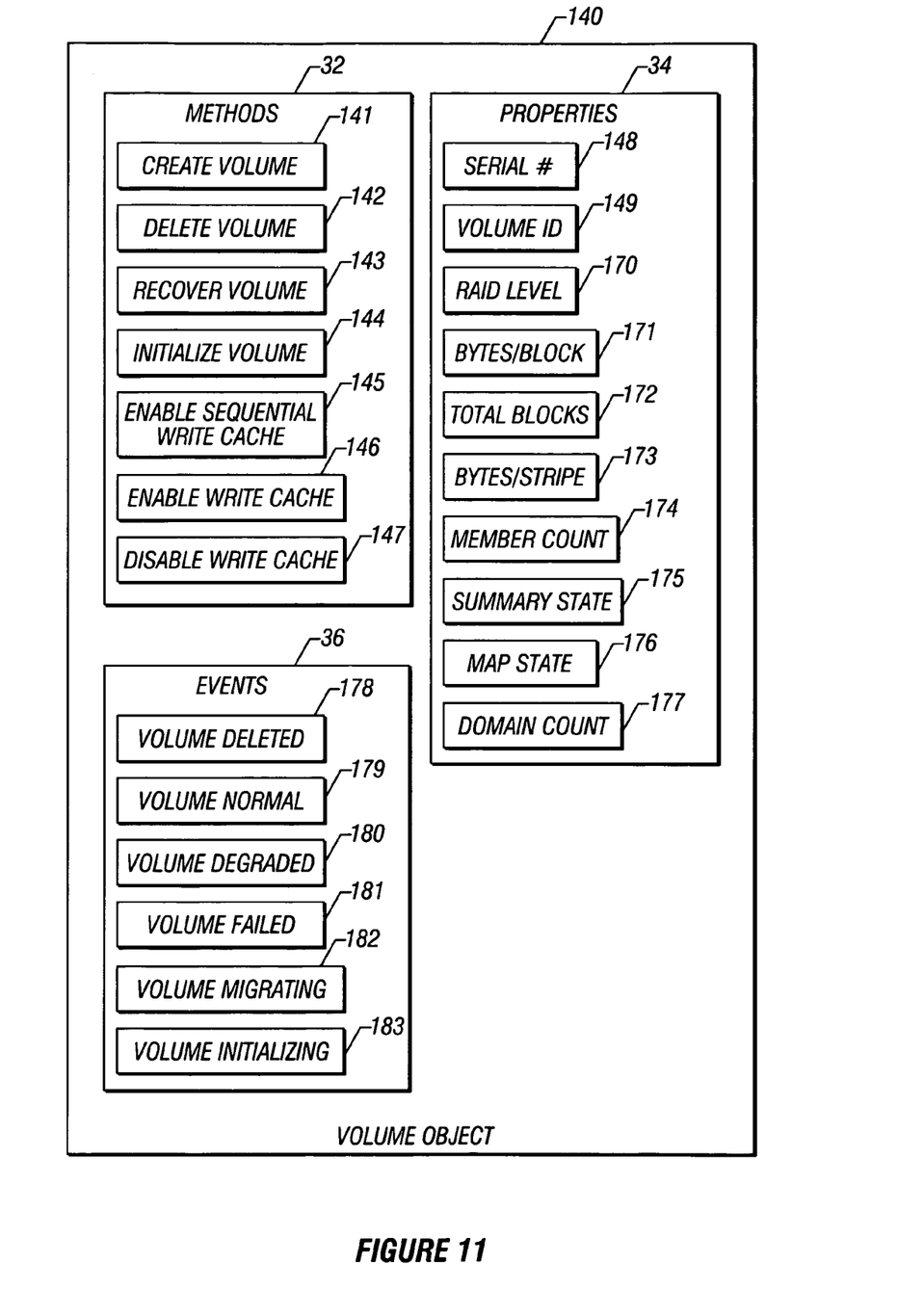
FIG. 11 is a block diagram of the volume object in accordance with one embodiment of the invention.

In FIGS. 10 and 11, the array object 130 and the volume object 140, like the disk object 120, include methods 32, properties 34 and events 36. In one embodiment of the invention, the array is defined as a physical grouping of one or more disks. Accordingly, the array object 130 includes a method 131 to create an array and a method 132 to expand an array. A disk count property 134 enables the RAID software 12a to identify the number of disks 120 included in the array 130. A volume degraded event 180 permits the RAID software 12a to receive notification when a volume 140 of the array 130 has degraded.

The volume object 140 (FIG. 11) includes methods such as a method 141 and a method 142, for creating and deleting a volume 140, respectively, from the RAID hardware devices 17a. Properties such as number of bytes per block 171 and total number of blocks 172 provide other indicia about the volume 140. The volume object 140 further includes event notification for failed, migrating, and initializing volumes, an event 181, an event 182, and an event 183, respectively.

Using the above objects in conjunction with the functions of the configuration library 20, the RAID software 12a may perform a number of operations on the RAID hardware devices 17a. Simply by controlling the properties 34 and methods 32 of the RAID objects 30a, the RAID software 12a can configure the RAID hardware devices 17a.

Figure 12:
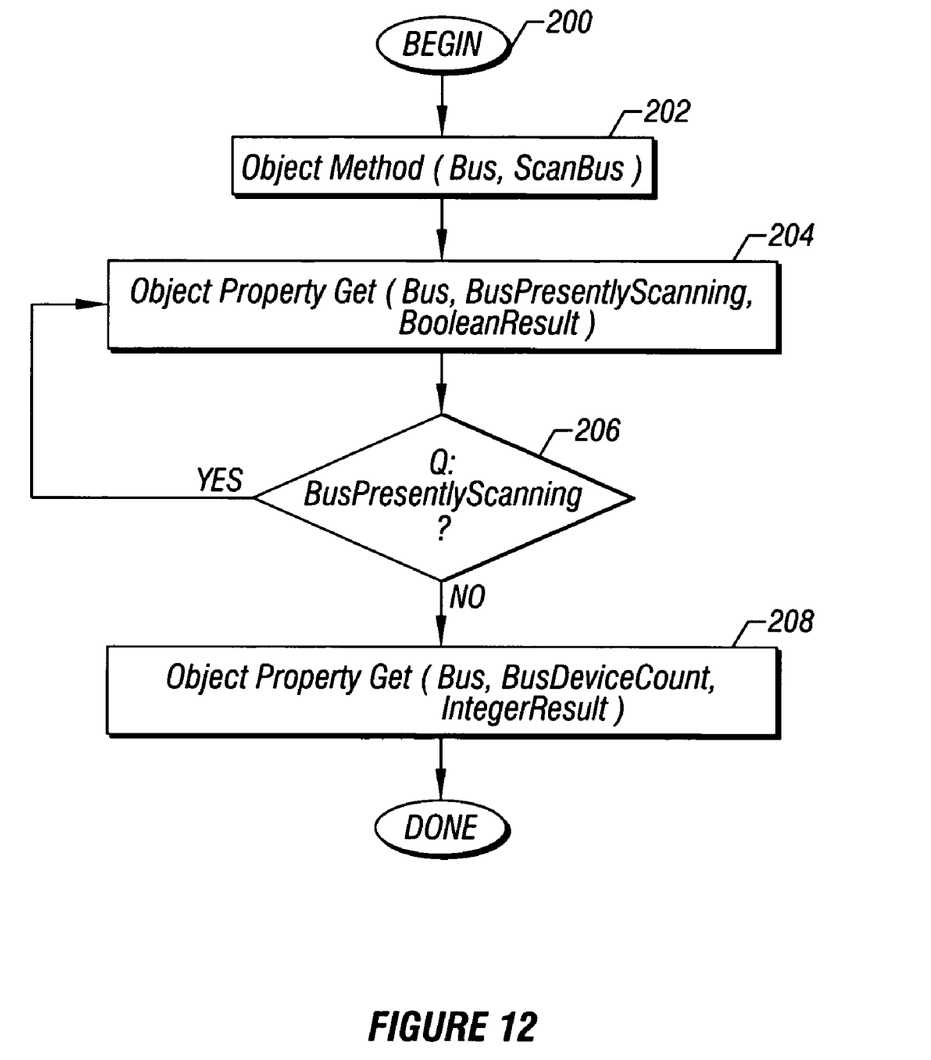
FIG. 12 is a flow diagram of a bus scan operation using the RAID object API in accordance with one embodiment of the invention.

As an example, the RAID software 12a may perform an operation to determine the devices which are located on a bus. Looking back to FIG. 5, suppose the RAID software 12a wants to determine which devices are connected to the SCSI bus 110A of the system 14. An operation to scan the SCSI bus 110A according to one embodiment of the invention includes invoking the method invocation function 62 of the configuration library 20 (see FIG. 3). In FIG. 12, the method invocation function 62 is passed two parameters (block 202). The object 30 for which a method 32 is invoked is provided as a parameter. In the RAID objects 30a, the available objects are controller objects 100, bus objects 110, disk objects 120, array objects 130, and volume objects 140. To scan the SCSI bus 110A, the bus object 110a is passed as a parameter. The method 32 to invoke from the passed object is also provided as a parameter.

Looking back to FIG. 8, the scan bus method 111 is the only method 32 available for the bus object 110, and is the desired method for performing a scan operation upon the SCSI bus 110A. Accordingly, the method invocation function 62 is invoked, and the bus object 110 and the scan bus method 11 are passed as parameters (block 202).

The get property function 64 is next invoked (block 204). The get property function 64 is passed three parameters: the object for which a property is to be retrieved, the property to be retrieved, and a location for storing the property value. As with the method invocation function 62, the bus object 110 is passed as a parameter. Also, the bus is presently scanning property 116, and a memory location for storing the result, are passed as parameters. The property 116 returns a Boolean result.

Once the get property function 64 is complete, the allocated memory location contains a zero (false) or one (true) result. The next operation (diamond 206) tests the value of the property 116. If true, the property get function 64 is once again invoked (block 204).

If the property 116 is false, however, the get property function 64 is invoked, this time with the bus device count property 115 passed as a parameter (block 208). The bus device count property 115 indicates to the RAID software 12a how many devices were found on the SCSI bus 110A as a result of the scanning operation. Accordingly, an integer value is stored in the bus device count memory location once the property is retrieved by the get property function 64. The scanning operation is thus complete (block 210).

Thus, an interface to hardware includes a configuration library and objects to model the hardware. Software programs using the interface need not understand how to communicate with the hardware. Instead, the software programs may communicate with the interface. In turn, the interface communicates with the hardware. Such an organization allows the software to be written even before the hardware is implemented, prior to the addition of new or different hardware, or under other conditions in which the hardware requirements are unknown.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system, comprising:
   a processor;
   a plurality of disks; and
   a memory storing software which:
   models the plurality of disks as a plurality of disk objects;
   provides a plurality of tools for performing a plurality of operations on the plurality of disk objects; and
   invokes a response by the plurality of disks to the plurality of operations performed on the plurality of disk objects.

2. The system of claim 1, wherein the software program is stored in the memory.

3. The system of claim 1, further comprising:
   a plurality of buses; and
   a plurality of controllers.

4. The system of claim 3, further comprising a memory storing software which:
   models the plurality of buses as a plurality of bus objects; and
   models the plurality of controllers as a plurality of controller objects.

5. The system of claim 4, further comprising a memory storing software which:
   models the plurality of volumes as a plurality of volume objects; and
   models the plurality of arrays as a plurality of array objects.

6. The system of claim 5, further comprising a memory storing software which invokes a response to the plurality of operations by:
   the plurality of buses for operations performed on the plurality of bus objects; and
   the plurality of controllers for operations performed on the plurality of controller objects.

7. A method comprising defining a plurality of hardware devices as a plurality of objects, providing a plurality of tools to perform a plurality of operations on the plurality of objects, executing a software program to use the plurality of tools, and responding to the plurality of operations by the plurality of hardware devices, wherein the plurality of objects comprise a redundant array of independent disk objects, and wherein the redundant array of independent disk objects comprises at least one disk object, at least one array object and at least one volume object.

* * * * *